United States Patent [19]

Shuford

[11] Patent Number: 5,324,541
[45] Date of Patent: Jun. 28, 1994

[54] POST COATING TREATMENT OF SILICON CARBIDE COATED CARBON-CARBON SUBSTRATES

[75] Inventor: David M. Shuford, Arlington, Tex.

[73] Assignee: Loral Vought Systems Corporation, Grand Prairie, Tex.

[21] Appl. No.: 627,850

[22] Filed: Jul. 5, 1984

Related U.S. Application Data

[63] Continuation-in-part of Ser. No. 516,948, Jul. 25, 1983.

[51] Int. Cl.$^5$ .......................... B05D 1/38; B05D 3/02
[52] U.S. Cl. .................................. 427/376.2; 427/226;
427/376.3; 427/379; 427/380; 427/419.1;
427/419.2; 427/419.7
[58] Field of Search ................... 427/226, 376.2, 376.3,
427/379, 380, 419.1, 419.2, 419.7

[56] References Cited

U.S. PATENT DOCUMENTS

| | | | |
|---|---|---|---|
| 3,249,460 | 5/1966 | Gerry | 427/376.2 X |
| 3,275,471 | 9/1966 | Lowell et al. | 427/376.2 |
| 3,955,034 | 5/1976 | Fletcher et al. | 428/332 X |
| 4,072,530 | 2/1978 | Hirame et al. | 106/84 X |
| 4,399,168 | 8/1983 | Kullander et al. | 427/419.1 X |
| 4,465,777 | 8/1984 | Shuford | 427/419.7 X |
| 4,471,023 | 9/1984 | Shuford | 427/419.7 X |

*Primary Examiner*—Richard D. Lovering
*Attorney, Agent, or Firm*—Richards, Medlock & Andrews

[57] ABSTRACT

A post treatment for protection from degradation at elevated temperatures of carbon and graphite materials to which have been applied a silicon carbide primary coating. The treatment comprising coating the substrate with a first film comprising monoaluminum phosphate, water, particulate silicon carbide, silicon carbide felt, alumina, and .boron; curing the first film, applying over the first film, a second film comprising monoaluminum phosphate, water, alumina and boron; curing the second film, applying a third film comprising water, sodium silicate, sodium borate, boron, particulate silicon carbide and silicon carbide felt; curing the third film, applying a fourth film comprising sodium borate, water, sodium silicate, boron and alumina which is cured after application.

14 Claims, No Drawings

POST COATING TREATMENT OF SILICON CARBIDE COATED CARBON-CARBON SUBSTRATES

CROSS REFERENCE TO RELATED APPLICATIONS:

This application is a continuation-in-part of co-pending application Ser, No, 516,948, filed on Jul. 25, 1983.

TECHNICAL FIELD

This invention relates to the protection of carbon and graphite materials from degradation at elevated temperatures. More particularly, the invention relates to the protection of reinforced carbon-carbon composite substrate materials having silicon carbide primary coatings, Specifically the invention relates to post-coating treatments used to create a sealant coating over primary silicon carbide coatings to protect the substrate from degradation through a wider range of elevated temperatures in oxygen containing environments.

BACKGROUND ART

Graphite and carbon materials, especially reinforced carbon-carbon composite substrate materials, are subject to many applications in modern industry, particularly in the aerospace and aviation fields. However, such materials, when unprotected, are subject to degradation at elevated temperatures. Since many applications involve high temperatures, resistance to high temperature and thermal shock are often required properties of the material.

Reinforced carbon-carbon composite substrates are generally constructed of fibers and bound by a carbon matrix, resulting in a material having excellent structural properties. Generally, carbonaceous fibers such as polyacrylonitrile, rayon or pitch-based fibers are utilized. Carbon-carbon impregnation materials generally are phenolic, furfuryl or pitch-based materials. Densification of the carbonaceous fibers can also be accomplished through use of chemical vapor deposition techniques to deposit carbon and form a matrix which strengthens the material. However, the use of a specific substrate material is not a limitation upon the present invention.

Graphite and carbon materials, including reinforced carbon-carbon composites, are subject to degradation, such as oxidation, when utilized in high temperature environments in the presence of oxygen. Generally, an unprotected graphite or carbon material will begin to oxidize at temperatures in excess of about 650° F. in air. Therefore, in order to effectively utilize these materials in high temperature applications, it is necessary to provide protection from degradation, including oxidation. Copending U.S. patent application Ser. Nos. 251,798 (now abandoned) and 252,117 (now abandoned) disclose protective coatings for carbon, graphite and carbon-carbon composite materials. U.S. patent application Ser. No. 251,798 (now abandoned) discloses a protective coating utilizing silicon, silicon carbide and alumina. U.S. patent application Ser. No. 252,117 (now abandoned) discloses a protective coating utilizing a composition containing boron, silicon carbide and silicon which is applied to carbon-carbon substrates. These types of primary protective coatings protect the carbon substrate very well at temperatures from about 2500° to about 3000° F. However, when the primary coating is subject to temperature cycles, it is theorized that the primary protective coatings can develop microcracks which become localized areas where oxidation can occur. Each time the substrate is cycled from ambient temperature to above about 2500° F., the possibility of oxidation at the microcracks occurs which can progressively weaken the part after each cycle. Impregnation with tetraethyl orthosilicate (TEOS) which penetrates the microcracks in the primary coating and then, upon curing, converts to silicon dioxide, is known to provide protection to otherwise exposed carbonaceous surfaces. It has also been known to use a silicon carbide paste and liquid alkali silicate materials in combination with TEOS impregnation to provide fairly effective enhancement coatings, i.e., a coating placed on the silicon carbide primary coating.

One indication of high temperature degradation resistance is the percent weight change of the coated substrate or part that is exhibited over a period of exposure in an elevated temperature environment containing oxygen. It is desirable for a coated substrate not to exhibit a significant weight change after exposure to high temperatures in oxygen containing environments since this could affect the performance of the device incorporating such materials.

Accordingly, a need exists for a method and composition of matter for forming of sealant film over the protective coating on carbon substrates that provides improved resistance to degradation at elevated temperatures in the range of from about 650° F. up to about 2500° F. Further, a need exists for a method and composition of matter for a post treatment sealant for the protective coating on reinforced carbon-carbon composite substrates wherein protection from degradation is provided where frequent cycling occurs between −300° F. and up to above 3500° F. Thus, the present invention provides a. post treatment sealant, which when utilized in combination with the primary protective coating, increases the dwell time and temperature range in which the carbon-carbon substrate is protected from oxidation. In an alternate embodiment, an enhancement coating is also provided and placed on the sealant coating.

DISCLOSURE OF THE INVENTION

In accordance with the present invention, a composition and method is provided for sealing the primary protective coating on carbonaceous substrate materials. The sealant coatings formed in accordance with the method and composition of the present invention exhibit excellent protection from oxidation and degradation in environments with cycling temperatures of from about −300° F. to about 2500° F.

Broadly stated, the composition for sealing the primary protective coating on carbonaceous substrate materials comprises four separately applied films. The first film is formed from a mixture comprising from about 25% to about 30% of monoaluminum phosphate, between about 9.2% and about 11.2% particulate silicon carbide, between about 15.2% and about 19.2% boron, from about 9.2% to about 11.2% silicon carbide felt, from about 10.4% to about 14.4% alumina, and from about 20% to about 25% water. (All percentages refer to weight percent.) Zirconia hydride may be substituted for boron where only relatively low temperatures will be encountered by the finished part.

Over the first film a second film is applied, preferably by vacuum impregnation or other pressure gradient method, which is formed from a mixture comprising from about 40% to about 48% monoaluminum phosphate, from about 9% to about 11% boron, from about 9% to about 11% alumina and from about 32% to about 40% water.

Over the second film is applied a third film formed from a mixture comprising between about 2.3% and about 2.7% sodium borate, between about 30.6% and about 38.6% of a 38% aqueous solution of sodium silicate, between about 21.7% and about 25.7% particulate silicon carbide, between about 21.7% and about 25.7% silicon carbide felt, from about 2.3% to about 2.7% boron, and from about 12.8% to about 14.8% water. In the preferred embodiment, over the third a fourth film is applied.

The fourth film, preferably applied by vacuum impregnation, or other pressure gradient method, is formed from a mixture comprising from about 51.4% to about 59.4% sodium silicate, from about 3.9% to about 4.3% sodium borate, from about 9.0% to about 11.0% boron, from about 9.0% to about 11.0% alumina and from about 18.6% to about 22.6% water.

In accordance with the method of the present invention, a sealant coating is formed on the primary protective coating of carbonaceous substrate materials for protecting the material from degradation at elevated temperatures. The method comprises forming a first film of an essentially uniform aqueous slurry of particulate silicon carbide, monoaluminum phosphate, silicon carbide felt, alumina and either boron or zirconia hydride in the range of the aforesaid composition, together with a sufficient amount of water (preferably distilled water). The slurry is applied to the material that is to be coated and the excess is wiped off and the material is dried at temperatures up to about 600° F. at a rate which does not cause blistering of the film.

Next, a second film is applied over the first by the process of vacuum impregnation or other pressure gradient method. The second film, an essentially uniform aqueous slurry of particulate monoaluminum phosphate, boron and alumina, is applied over the part having a dried first film, and is placed in a vacuum for a period sufficient to remove air from the coated substrate and to assure the second film material thoroughly coats the surfaces of the part. The part is then removed from the vacuum, excess second film material is wiped off and the part is dried by graduated heating up to a temperature of about 600° F. and at a rate which prevents blistering of the coating.

The coated part comprising the dried first and second films is then cured in an inert atmosphere up to a temperature of about 1800° F. and at a rate which does not cause blistering of the film. The film is maintained at about 1800° F. for a period of time sufficient to complete the cure, about 1 hour or longer.

Thereafter, a third film is applied over the cured second film. The third film is an essentially uniform slurry of particulate silicon carbide, silicon carbide felt, sodium borate, sodium silicate, boron and water in the ranges set forth above. The third slurry mixture is applied over the cured second film and the excess wiped off. The material is then dried with graduated heating to a temperature up to about 600° F. at a rate which prevents blistering of the film.

The dried third film is then coated with a fourth film composition. The part having a dried third film is covered by the fourth film composition (which is slurry comprising sodium silicate, sodium borate, boron and alumina) and is placed in a vacuum for a period sufficient to remove air from the coated substrate and to assure the fourth film material thoroughly coats the surfaces of the part. The part is removed from the vacuum. The excess fourth film material is then wiped off and the part dried by graduated heating up to a temperature of about 600° F. and at a rate which prevents blistering of the coating.

The sealant coating formed from application of the four described films is useful for protecting the substrate material from degradation at temperatures up to about 3500° F. in air. As used herein "sealant coating" means the coating formed over the primary protective coating by application of the first and second, third and fourth films as described herein.

In yet another aspect, the sealant coating of the present invention may be covered by an enhancement coating. In one embodiment, the enhancement coating is formed by impregnating the sealant coating with tetraethyl orthosilicate. The tetraethyl orthosilicate is then heat cured on the sealant coating forming a silica coating. Thereafter, a slurry of an alkali silicate liquid and silicon carbide powder is applied to the surface and heat cured. Alternatively, a mixture of water, sodium borate and sodium silicate can be substituted for the liquid alkali silicate. In accordance with another embodiment of the enhancement coating, a monoaluminum phosphate solution containing alumina and silicon carbide is applied to the surface of the sealant coating and is thereafter heat cured.

DETAILED DESCRIPTION

In accordance with one aspect of the present invention, a composition is provided for sealing a primary protective coating on carbon-carbon substrate materials. While the present invention is primarily concerned with protecting reinforced carbon-carbon composite substrates, the invention is also applicable to the formation of sealant coatings on the protective coatings on various types of graphite and carbon substrates. The term "carbonaceous substrate" for purposes of this invention includes all such materials. All percentages herein are weight percent unless otherwise indicated.

The primary coating is useful for protecting carbonaceous substrates from degradation at sustained temperatures of between about 2500° F. to about 2900° F. However, where the part is subject to cycling through temperatures below 2500° F. in an oxygen containing atmosphere, the possibility for oxidation exists at temperatures above about 650° F. The sealant coating of the present invention when applied over the primary coating increases oxidation resistance in the temperature range of from about 650° F. to about 2500° F. The post-treatment sealant coating is formed by the application of four separate films over the primary coating.

TEOS TREATMENT

In some cases, it is desirable to prepare the primary coating for application of the sealant coating. In general, if the sealant coating is not applied immediately after the primary protective coating is applied, it is desirable to prepare the primary protective coating by impregnating the primary protective coating with tetraethyl orthosilicate (TEOS). After the tetraethyl orthosilicate is applied, it is heat cured at a temperature between about 225° F. and 275° F. for a period sufficient to form a silica coating, usually from about 45 minutes to 60 minutes after the tetraethyl orthosilicate solidifies, forming crystals. More than one application of tetraethyl orthosilicate is preferred and preferably five applications are made. Preferably, after the final impregnation of the part, it is maintained at a temperature between about 225° F. and 275° F. for about two hours or longer after crystallization of the tetraethyl orthosilicate. After the primary coating has been impregnated with the tetraethyl orthosilicate and, cured to 600° F., the first film of the sealant coating is applied.

SEALANT COATING

The sealant coating of the present invention is not a separate distinct coating but rather forms with and becomes integrated into the primary protective coating.

The first film is prepared by forming a slurry from about 25% to about 30% monoaluminum phosphate, from about 20% to about 25% water, from about 9.2% to about 11.2% particulate silicon carbide, from about 9.2% to about 11.2% silicon carbide felt, from about 10.4% to about 14.4% alumina, and from about 11.0% to about 15.2% boron. The first film is applied, the excess is wiped off and then it is dried with progressive temperature increases up to about 600° F. in an air atmosphere. The progressive heating is applied at such a rate as to prevent blistering of the film.

The second film is then applied to the substrate over the primary coating and first film. The second film is prepared by forming a slurry of from about 40% to about 48% monoaluminum phosphate, from about 32% to about 40% water, from about 9% to about 11% alumina and from about 9% to about 11% boron. The part is covered with the second slurry and placed in a vacuum for a period sufficient to remove air from the coated substrate and to assure the second film material thoroughly coats the surfaces of the part. The part is removed from the vacuum and the excess material wiped off. The part is then again cured by progressive heating to about 600° F. The rate of heating is such to prevent blistering or bubbling of the adsorbed slurry and binder solutions.

After drying in air, the substrate is then placed in an inert gas atmosphere for further curing with progressive heating up to a temperature of about 1800° F. Again, the heating rate is such that blistering of the films is prevented. Those skilled in the art will recognize that the drying in an air atmosphere can be omitted, however, it is preferable for economic reasons. The part is heated at about 1800° F. for a period sufficient to complete the curing process. Normally, heating the part at about 1800° F. for about 1 hour is sufficient to complete the cure.

The second film may be treated with TEOS as described above before application of the third film. Preferably the cured second film is impregnated with TEOS.

The third film is then applied to the substrate over the primary coating and first and second films. The third film is prepared by forming a slurry of from about 2.3% to about 2.7% sodium borate, from about 30.6% to about 38.6% of a 38% sodium silicate solution, from about 12.8% to about 14.8% water, from about 21.7% to about 25.7% particulate silicon carbide, from about 21.7% to about 27.7% silicon carbide felt and from about 2.3% to about 2.7% boron. The slurry is applied to the prepared substrate having the primary coating and the first and second films, for example, by a brush, and the excess is wiped off. The third film is then cured by progressively heating the substrate up to about 600° F., which may be done in an air atmosphere, to cure the part.

In the preferred embodiment, after the part has been treated with the third film it is then again covered with a fourth film by vacuum impregnating a slurry, comprising from about 3.9% to about 4.3% sodium borate, from about 23.1% to about 28.3% water, from about 9.0% to about 11.0% boron, from about 9.0% to about 11.0% alumina, and from about 51.4% to about 59.4% of a 38% aqueous sodium silicate solution. The part covered with the slurry is then maintained in a vacuum for about 30 minutes. The part is removed from the vacuum and excess material wiped off. The part is then again cured by progressive heating to about 600° F. . The rate of heating is such to prevent blistering or bubbling of the adsorbed slurry and binder solutions.

The part prepared in this manner exhibits greatly improved oxidation protection of the substrate when subjected to lower temperatures such as between about 650° F. and about 2500° F.

In the preferred embodiment of the present invention the films have the following compositions. The first film comprises about 27.5% monoaluminum phosphate, about 22.5% water, about 10.2% particulate silicon carbide, about 10.2% silicon carbide felt, about 12.4% alumina and about 17.2% boron. It is desirable that the alumina be an admixture of high purity alumina and alumina hydrate in a ratio of high purity alumina to alumina hydrate in the range of 6.5: 1 to 7.5:1.

The preferred composition of the second film is about 44% monoaluminum phosphate, about 36% water about 10% boron, and about 10% alumina.

The preferred composition of the third film is about 34.6% of a 38% solids sodium silicate solution, about 13.8% water, about 23.7% particulate silicon carbide, about 23.8% silicon carbide felt, about 2.5% sodium borate, and about 2.5% boron.

The preferred composition of the fourth film is about 4.1% sodium borate, about 20.6% water, about 55.4% of a 38% aqueous solution of sodium silicate, about 10% boron, and about 10% alumina.

Preferably, particulate amorphous boron is utilized and one preferred type can be obtained from the Kerr McGee Company, a corporation of the State of Delaware, sold under the trade designation "Trona" which contains about 90% to 92% by weight of particulate boron with the remainder containing impurities of which magnesium is the major impurity. While understanding the function of the magnesium is not essential to practicing the invention, it is believed that the magnesium present in the boron acts as a fluxing agent facilitating formation of the sealant layer.

Preferably, the particle size of the boron is between about 0.5 and 20 microns; and the particle size of the particulate silicon carbide is between about 4.5 and 20.5 microns. The most preferred type of silicon carbide is sold under the trade designation "RA 1200," Class 1- "black grit" by the Carborundum Company, a corporation of the State of Delaware. Zirconia hydride can be substituted for boron.

Preferably, an argon gas is utilized for the inert atmosphere, at a pressure of about 3 psi (gauge).

After curing of the first film, the second film is applied as described above. Preferably, the sodium silicate solution contains 39% solids such as solution sold by Ridlen Mfg. Co. of Dallas, Tex.

Preferably, the graphite felt utilized is "grade WDF" from the Union Carbide Company, Carbide Products Division of New York, N.Y. The graphite felt can be converted to silicon carbide felt by packing the felt in a mixture containing between about 30% and 60% by weight silicon carbide, between about 30% and 50% by weight silicon and between about 10% and 20% by weight alumina. Preferably, the packed graphite felt is heated between about 2950° F. and 3050° F. for about 5-6 hours. After the graphite felt has been converted to silicon carbide felt, the felt is powdered by any suitable method, such as a ball mill. The powdered silicon carbide converted felt should have a small random fiber size. Preferably the fibers will have a diameter of about 8 microns and will be of varied length, ranging between about several microns and about 0.01 inches. Similar materials, purchased in a prepared form of short fibers are also suitable.

In the preferred embodiment, the alumina required for the first film is provided by utilizing two types of alumina "T-61" alumina and "C-333" alumina in a ratio of about 7:1. Two different types of alumina are preferred because T-61 is a high purity, low shrinkage and chemically inert material, while C-333 is a hydrate that serves as a catalyst for the monoaluminum phosphate curing mechanism.

In the preferred embodiment, the alumina to be used in the second and fourth film compositions is provided by utilizing only the "C-333" type of alumina.

Alumina sold under the trade designations "T-61" and "C-333" are both products of the Alcoa Corporation of Pittsburgh, Pa.

Various advantages of the invention are apparent from the following example:

EXAMPLE

A reinforced carbon-carbon composite substrate was prepared with a primary coating of silicon carbide-silicon-alumina in accordance with the method described in copending U.S. patent application Ser. No. 251,798 (now abandoned).

Samples were prepared as described above wherein the first slurry had the composition of 27.5% monoaluminum phosphate, 22.5% water, 10.2% particulate silicon carbide, 10.2% silicon carbide felt, 12.4% alumina and 17.2% boron, and wherein the second slurry had the composition of 44% monoaluminum phosphate, 36% water, 10% boron, and 10% alumina, and wherein the third slurry had the composition of 2.5% sodium borate, 13.8% water, 34.6% of a 38% aqueous solution of sodium silicate, 23.7% particulate silicon carbide, 23.8% silicon carbide felt and 2.5% boron and wherein the fourth slurry had a composition of 4.1% sodium borate, 55.4% sodium silicate, 20.6% water, 10% boron and 10% alumina.

After application of the coatings, the substrate was tested by subjecting it to air at 1000° F. to 2400° F. for 60 hours. The substrate exhibited a net mass change of —0.0088 9 gms/cm$^2$ of substrate surface area. Substrates treated in accordance with the present invention utilizing all four coatings exhibited flexure strength of 21,100 psi.

ENHANCEMENT COATING

In accordance with another aspect of the present invention, the sealant coating may be protected by an enhancement coating. The enhancement coatings described herein afford additional protection of the substrate at temperatures below about 2500° F.

In accordance with one embodiment, the sealant coating is impregnated with tetraethyl orthosilicate. The tetraethyl orthosilicate is then heat cured to 600° F. on the sealant coating thereby forming a silica coating. Thereafter, a mixture of an alkali silicate liquid and silicon carbide powder is applied to the surface and is then heat cured. Preferably, the tetraethyl orthosilicate is applied five times to the sealant coating and heat cured after each application. Generally, the tetraethyl orthosilicate is cured at between about 225° F. and 275° F. for between about 45 and 60 minutes after the tetraethyl orthosilicate solidifies, forming crystals.

Preferably, after the fifth impregnation, the part is heated between about 225° F. and 275° F. for about two hours after crystallization of the tetraethyl orthosilicate. Then, the part is cooled and reheated to between about 375° F. and 425° F. for between 2 and 2.5 hours. Finally, the substrate is maintained at between about 565° F. and 625° F. for between about 4 and 7 hours.

After the sealant coating has been impregnated with the tetraethyl orthosilicate and cured, a slurry of an alkali silicate liquid and silicon carbide powder is applied to the surface and heat cured. Alternatively, a mixture of water, sodium borate and sodium silicate can be substituted for the liquid alkali silicate. Preferably, for 100 ml. of water, the mixture includes 10 gm of sodium borate and 100 ml of a sodium silicate solution containing 38% solids sold by Ridlen Mfg. Co. of Dallas, Tex. The slurry is applied to the surface using a brush, spatula or other type of applicator. Preferably, the area of the part that is being coated with the slurry is kept in a wet condition as the slurry is being applied. The excess slurry is wiped off using, for example, a cheesecloth material.

After application of the slurry to the part, it is dried and cured. Preferably, the drying procedure is accomplished under ambient conditions for a period of about sixteen hours. Thereafter, the slurry is heat cured. Preferably, curing takes place by maintaining a temperature of between about 185° F. and 225° F. for at least about two hours, thereafter increasing the temperature to between about 375° F. and 425° F. for at least about two hours and finally increasing the temperature to between about 575° F. and 625° F. for between about 4 and 7 hours.

In accordance with a preferred embodiment of the enhancement coating, the slurry contains about 50 parts by weight of an alkali silicate liquid, most preferably the alkali silicate liquid sold under the trade name "Sermabond 487" by the Sermetel Corporation of Limerick, Pennsylvania, and about 50 parts by weight of a powder mixture containing equal amounts of black silicon carbide powder sold under the trade designation "RA 1200" by the Carborundum Company. Preferably, the graphite felt utilized is "grade WDF" from the Union Carbide Company, Carbide Products Division of New York, N.Y. The graphite felt can be converted to silicon carbide felt by packing the felt in a mixture containing between about 30% and 60% by weight silicon carbide, between about 30% and 50% by weight silicon and between about 10% and 20% by weight alumina. Preferably, the packed graphite felt is heated between about 2950° F. and 3050° F. for about 5-6 hours. After the graphite felt has been converted to silicon carbide felt, the felt is powdered by any suitable method, such as a ball mill. The powdered silicon carbide converted felt should have a small random fiber size. Preferably the fibers will have a diameter of about 8 microns and will be of varied length, ranging between about several microns and about 0.01 inches. Similar materials purchased in the form of silicon carbide fibers are also suitable.

In accordance with an alternate embodiment of the enhancement coating, a monoaluminum phosphate solution containing particulate alumina and silicon carbide is applied to the surface of the sealant coating and is thereafter heat cured. Preferably, the liquid portion of the slurry contains about 55% by weight monoaluminum phosphate and about 45% by weight distilled water. The powder components of the slurry are preferably about 25.0% particulate silicon carbide by total weight of the powder components, preferably silicon carbide sold under the trade designation "RA 1200" by the Carborundum Company; about 25.0% of particulate silicon carbide converted felt by total weight of the powder components; about 20% of particulate boron by total weight of the powder components, preferably boron sold under the tradename "Trono" which contains about 90% to 92% by weight, particulate boron with the remainder being impurities of which magnesium is the major impurity; about 26.25% particulate alumina by weight of the powder components, sold under the trade designation "T-61"; and about 3.75% by weight particulate alumina, preferably that sold under the trade designation "C-333", both from the Alcoa Corporation of Pittsburgh, Pa. The liquid and particulate components are combined in a ratio that is preferably about 1:1. The slurry can be applied using either a brush, spatula or other suitable instrument. The excess slurry is wiped off from the surface, preferably with a dry cheesecloth. The slurry applied to the surface is then heat cured. Preferably, after the slurry has been applied to the primary coating, it is dried at ambient temperature for about 16 hours. Thereafter the slurry is cured by being maintained at about 200° F. for about two hours, then at about 400° F. for about two hours and finally at about 600° F. for about four hours. The curing is accomplished in an air oven and no special atmospheric requirements are necessary.

While the invention has been described with respect to preferred embodiments, it will be understood that the invention is capable of numerous rearrangements, modifications and alterations and such rearrangements, modifications and alterations are intended to be within the scope of the appended claims.

I claim:

1. A method for post coating a carbonaceous substrate having a primary protective coating comprising silicon carbide comprising the steps of:
   (a) applying over said primary protective coating a first aqueous slurry comprising monoaluminum phosphate, particulate silicon carbide, silicon carbide felt, alumina and a material selected from the group consisting of boron and zirconia hydride in a composition effective to coat said primary protective coating and heating to a temperature and for a time effective to cure the resulting coat of said first slurry to form a first sealant film;
   (b) applying over said first sealant film a second aqueous slurry comprising monoaluminum phosphate, boron, and alumina in a composition effective to coat said first sealant film and heating to a temperature and for a time effective to cure the resulting coat of said second slurry to form a second sealant film;
   (c) heating the coated substrate of step (b) by progressively rising temperatures of up to about 1800° degrees F. in an inert atmosphere;
   (d) applying over said second sealant film a third aqueous slurry comprising sodium silicate, sodium borate, particulate silicon carbide and silicon carbide felt in a composition effective to coat said second sealant film and heating to a temperature and for a time effective to cure the resulting coat of said third slurry to form a third sealant film;
   (e) applying over said third sealant film a fourth aqueous slurry comprising sodium silicate, sodium borate, boron and alumina in a composition effective to coat said third sealant film and heating to a temperature and for a time effective to cure the resulting coat of said fourth slurry to form a fourth sealant film, thereby forming a carbonaceous substrate having a sealant coating.

2. A method for post-treating of a carbonaceous substrate having a primary protective coating of silicon carbide to seal the silicon carbide coating and substrate comprising:
   (a) forming a first slurry of from about 25% to about 30% monoaluminum phosphate, from about 20% to about 25% water, from about 9.2% to about 11.2% particulate silicon carbide, from about 9.2% to about 11.2% silicon carbide felt, from about 10.4% to about 14.4% alumina, and from about 15.2% to about 19.2% of a material selected from the group consisting of boron and zirconia hydride;
   (b) coating the primary coating of the carbonaceous substrate with a film of said first slurry and heating to a temperature and for a time effective to cure said film of said first slurry to form a first sealant film;
   (c) forming a second slurry from about 40% to about 48% monoaluminum phosphate, from about 32% to about 40% water, from about 9% to about 11% boron, and from about 9% to about 11% alumina;
   (d) coating the substrate produced in step (b) with a film of said second slurry using a pressure gradient method of application and heating to a temperature and for a time effective to cure said film of said second slurry to form a second sealant film;
   (e) curing the substrate by progressive heating to about 1800° degrees F. in an inert atmosphere;
   (f) forming a third slurry of from about 12.8% to about 14.8% water, from about 30.6% to about 38.6% of a 38% aqueous solution of sodium silicate, from about 2.3% to about 2.7% sodium borate, from about 21.7% to about 25.7% particulate silicon carbide, and from about 21.7% to about 25.7% silicon carbide felt;
   (g) coating the substrate produced in step (e) with a film of said third slurry and heating to a temperature and for a time effective to cure said film of said third slurry to form a third sealant film;
   (h) forming a fourth slurry comprising from about 3.9% to about 4.3% sodium borate, from about 18.6% to about 22.6% water, and from about 51.4% to about 59.4% of a 38% aqueous solution of sodium silicate; and
   (i) coating the substrate produced in step (g) with a film of said fourth slurry and heating to a temperature and for a time effective to cure said film of said fourth slurry to form a fourth sealant film, thereby forming a carbonaceous substrate having a sealant coating.

3. The method of claim 2 wherein said first slurry is about 27.5% monoaluminum phosphate, about 22.5% water, about 10.2% particulate silicon carbide, about 10.2% silicon carbide felt, about 17.2% boron, and about 12.4% alumina.

4. The method of claim 2 wherein said second slurry is about 44% monoaluminum phosphate, about 36% water, about 10% boron, and about 10% alumina.

5. The method of claim 2 wherein said third slurry is about 2.5% sodium borate, about 13.8% water, about 34.6% of a 38% aqueous solution of sodium silicate, about 23.7% particulate silicon carbide, and 23.8% silicon carbide felt and about 2.5% boron.

6. The method of claim 2 wherein said fourth slurry is about 4.1% sodium borate, 55.4% sodium silicate, 20.6% water, 10% boron, and 10% alumina.

7. The process of claim 2 wherein said second film is cured at about 1800° F. for at least about 1 hour.

8. The method of claim 1 or 2 and further comprising the steps of:
   (a) impregnating the sealant coating with tetraethyl orthosilicate;
   (b) heating the tetraethyl orthosilicate applied to said sealant coating to a temperature and for a time effective to cure the impregnated sealant coating;
   (c) thereafter applying a mixture of a liquid alkali silicate and particulate silicon carbide to the sealant coating; and
   (d) heating the alkali silicate and silicon carbide mixture applied to the sealant coating to a temperature and for a time effective to cure said mixture.

9. The method as recited in claim 8 wherein said tetraethyl orthosilicate is cured by heating between about 225° F. and about 275° F. to form crystals, it is then heated to 600° F. to complete the cure and said alkali silicate and silicon carbide mixtures are cured by heating up to about 625° F.

10. The method for post-treating of a carbonaceous substrate having a sealant coating as described in claim 1 or 2 by forming an enhancement coating to the sealant coating comprising the steps of:
   (a) applying to the surface of the sealant coating a mixture of an aqueous monoaluminum phosphate solution containing an admixture of particulate alumina, silicon carbide felt, particulate silicon carbide and boron in a composition effective to coat said sealant coating; and
   (b) heating the mixture to a temperature and for a time effective to cure the mixture and form the enhancement coating.

11. The method as recited in claim 10 wherein the aqueous monoaluminum phosphate solution containing an admixture of particulate silicon carbide, silicon carbide felt, boron, and alumina is allowed to dry at ambient temperature and is thereafter heat cured by maintaining at a temperature of about 200° F. for about two hours, then at about 400° F. for about two hours and finally at about 600° F. for about four hours.

12. The method of claim 11 wherein said aqueous monoaluminum phosphate solution contains about 55% by weight monoaluminum phosphate, and said admixture contains about 25% particulate silicon carbide, about 25% silicon carbide felt, about 20% boron, and about 30% alumina by weight of the admixture.

13. The method of claim 11 wherein the ratio of said aqueous monoaluminum phosphate solution to the admixture of silicon carbide felt, particulate silicon carbide, boron, and alumina is about 1:1.

14. The method of claim 1 or 2 further comprising the initial step of preparing the primary protective coating by
   (a) applying tetraethyl orthosilicate to the primary coating; and
   (b) heat curing the tetraethyl orthosilicate to form a silica coating.

* * * * *